(12) United States Patent
Maharjan et al.

(10) Patent No.: US 11,581,835 B1
(45) Date of Patent: Feb. 14, 2023

(54) SENSOR LESS MAGNET TEMPERATURE ESTIMATION IN PERMANENT MAGNET MACHINES

(71) Applicant: Amazon Technologies, Inc., Seattle, WA (US)

(72) Inventors: Lizon Maharjan, Richardson, TX (US); Xiaoqi Wang, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/360,946

(22) Filed: Jun. 28, 2021

(51) Int. Cl.
*H02P 21/16* (2016.01)
*H02P 21/14* (2016.01)
*H02P 21/18* (2016.01)
*H02P 21/22* (2016.01)

(52) U.S. Cl.
CPC ............ *H02P 21/16* (2016.02); *H02P 21/141* (2013.01); *H02P 21/18* (2016.02); *H02P 21/22* (2016.02); *H02P 2207/055* (2013.01)

(58) Field of Classification Search
CPC ........ H02P 21/16; H02P 21/141; H02P 21/18; H02P 21/22; H02P 2207/055; H02P 29/66
See application file for complete search history.

(56) References Cited

U.S. PATENT DOCUMENTS

| | | | |
|---|---|---|---|
| 9,503,010 B2* | 11/2016 | Kim | H02P 21/141 |
| 2016/0352275 A1* | 12/2016 | Senoo | H02P 21/16 |
| 2017/0373629 A1* | 12/2017 | Shin | H02P 21/0025 |
| 2019/0338745 A1* | 11/2019 | Hao | F02N 11/0851 |

FOREIGN PATENT DOCUMENTS

| | | | | |
|---|---|---|---|---|
| EP | 2592748 A2 * | 5/2013 | | D06F 33/02 |
| WO | WO-2012115897 A2 * | 8/2012 | | H02P 21/141 |

OTHER PUBLICATIONS

Hai Guo et al., "Predicting Temperature of Permanent Magnet Synchronous Motor Based on Deep Neural Network," Energies 2020, 13, 4782, Jul. 2020, 14 pages.

\* cited by examiner

*Primary Examiner* — Bickey Dhakal
(74) *Attorney, Agent, or Firm* — Patterson + Sheridan, LLP

(57) ABSTRACT

Techniques and apparatus for determining the temperature of a permanent magnet on a rotor of an electrical motor. An example techniques involves determining a first set of parameters for controlling the electrical motor. A temperature of the rotor during a runtime of the electrical motor is determined, based at least in part on the first set of parameters and a first back-electromotive force (back-emf) associated with the electrical motor. A first estimate of a magnetic flux of the permanent magnet is determined based on the temperature of the rotor. An operation of the electrical motor is controlled based at least in part on the first estimate of the magnetic flux of the permanent magnet.

20 Claims, 12 Drawing Sheets

SENSOR LESS MAGNET TEMPERATURE ESTIMATION IN PERMANENT MAGNET MACHINES

BACKGROUND

The present disclosure generally relates to electric motors and, more specifically, to techniques for determining the temperature of a permanent magnet on a rotor of an electrical motor.

Electrical motors (or machines), such as permanent magnet machines (also known as permanent magnet motors) (PMMs), are used in a wide variety of electrical devices. Such electrical devices can include, for example, electric vehicles, autonomous aerial and ground vehicles (also known as drones), personal electric vehicles (e.g., electric scooters, electric skateboards, electric bikes, etc.), air conditioning units, and so on. PMMs operate based on permanent magnets (PMs) and the performance of the PMMs generally depends on the PM temperature. For example, the temperature of the PM can impact the torque output of the motor, the position estimation for the motor controller, etc. Additionally, demagnetization and/or physical damage of the PM can occur when the temperature of the PM reaches a certain value. This in turn can lead to failure of the PMM and electrical device.

BRIEF DESCRIPTION OF DRAWINGS

Various embodiments in accordance with the present disclosure will be described with reference to the drawings, where like designations denote like elements.

DETAILED DESCRIPTION

Embodiments described herein provide techniques for determining the temperature of a permanent magnet (PM) within an electric motor, such as a permanent magnet machine (or permanent magnet motor) (PMM). For example, the performance of a PMM is generally dependent on the temperature of the PMs. However, in many PMMs, the PM(s) is generally located on the rotor, which is a rotating element. Thus, it can be impractical (or not possible) to directly measure the temperature of the PM(s).

In one embodiment described herein, a sensorless PM temperature detection technique uses known electrical parameters and other information of the electric motor (e.g., winding temperature, permanent magnet flux, etc.) to estimate the temperature of the PM(s). More specifically, the sensorless PM temperature detection may estimate the temperature of the rotor and use the temperature estimate of the rotor as the temperature of the PM(s).

The sensorless PM temperature detection technique may implement a back-electromotive force (back-emf) based estimation technique to predict the temperature of the rotor of the electric motor, where the rotor temperature is indicative of the PM temperature. As described below, for example, the back-emf may be used as an estimate of the magnetic flux of the PM when the PM as at a predefined temperature (e.g., room temperature). The sensorless PM temperature detection technique can predict (or estimate) the rotor temperature in real-time (e.g., during a runtime of the electric motor). The predicted rotor temperature can then be used to update the parameters used to control operation of the electric motor.

In this manner, embodiments can significantly improve the performance of the electric motor control system (e.g., relative to the performance of control systems that do not measure the PM temperature). For example, by using the back-emf based estimation technique described herein to predict the temperature of the rotor within the electric motor in real-time, embodiments can enable the control system to accurately determine the state of the electric motor, allowing for improved control of the electric motor. Additionally, by accurately determining the temperature of the rotor (or rotor temperature), embodiments can enable the control system to detect when the electric motor is entering a critical state (e.g., PM temperature is within a threshold range) and prevent the electric motor from reaching the critical state to reduce (or prevent) damage to the electric motor.

Figure 1:
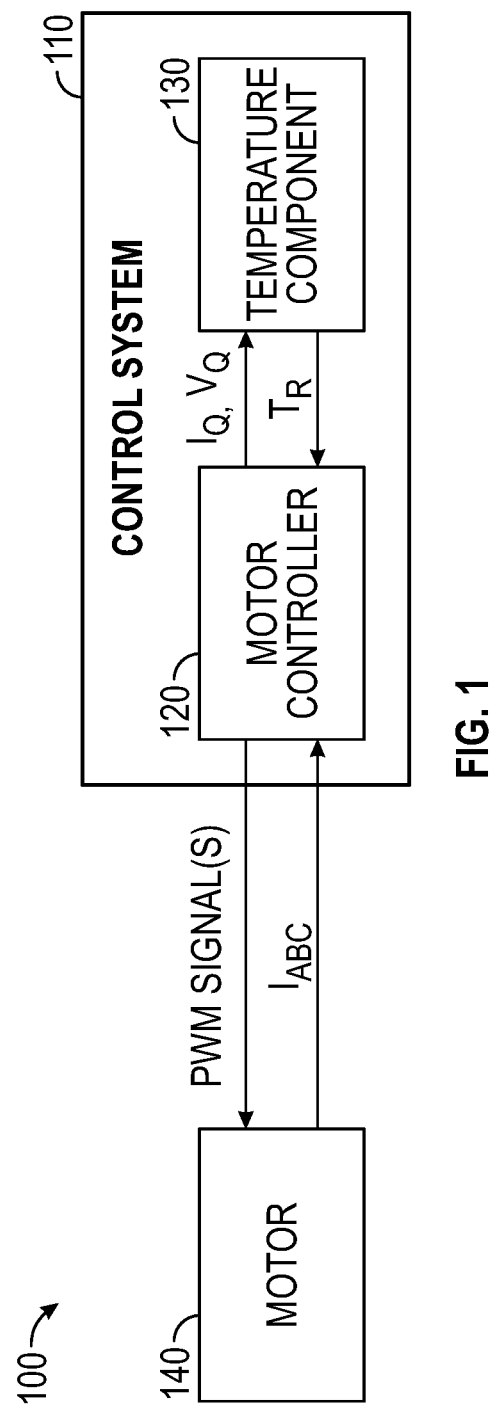
FIG. 1 is a block diagram of a system including a temperature component for determining the temperature of a PM of an electric motor, according to one embodiment.

FIG. 1 is a block diagram of an example system 100 including a temperature component for determining the temperature of a PM of an electric motor, according to one embodiment. As shown, the system 100 includes a control system 110 and a motor 140. The control system 100 can include hardware, software, or combinations thereof. Here, the control system 100 includes a motor controller 120, which is configured to generate one or more control signals for controlling the motor 140.

The motor controller 120 is generally representative of a field oriented control (FOC) motor controller. In one embodiment, the motor controller 120 can implement torque-based control of the motor 140. In another embodiment, the motor controller 120 can implement speed-based control of the motor 140. The motor controller 120 can control operation of the motor 140 using a sensorless FOC scheme, which does not rely on feedback from the motor 140. Note, however, that the motor controller 120 can employ other types of control schemes, including, for example, sensor FOC schemes that use feedback from the motor 140. When implementing a sensorless FOC scheme, the motor controller 120 can use a three phase current signal (e.g., $I_{abc}$) to generate direct and quadrature current values, $I_d$ and $I_q$, respectively. The motor controller 120 can use the direct and quadrature current values, $I_d$ and $I_q$ to generate pulse width modulation (PWM) signals for controlling the motor 140.

Figure 2:
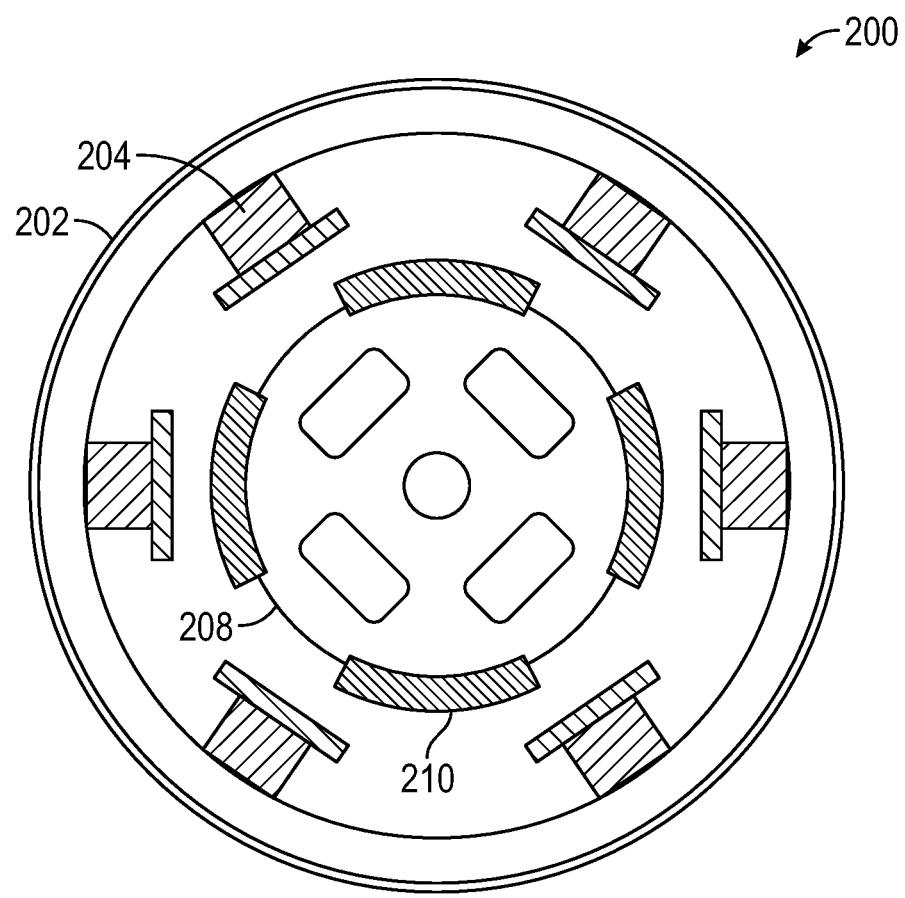
FIG. 2 illustrates a front view of an example permanent magnet synchronous motor.

The motor 140 is generally a PMM, which is an alternating current (AC) motor that uses permanent magnets embedded into or attached to the surface of the motor's rotor to generate a constant magnetic field (or motor flux or magnetic flux). Note, however, that in some embodiments, the motor 140 can include a permanent magnet direct current (PMDC) motor. In one particular embodiment, the motor 140 is a permanent magnet synchronous motor (PMSM). FIG. 2 illustrates a front view of a PMSM 200 (which is one example of a motor 140). The PMSM 200 includes a stator 202, one or more (e.g., six) windings 204, a rotor 208, and one or more (e.g., four) PMs 210 disposed on the rotor 208. The windings 204 may be wrapped around one or more stator teeth. The stator 202 generally carries the windings 204 connected to an AC supply to produce a rotating magnetic field. At synchronous speed, the poles of the rotor 208 lock to the rotating magnetic field.

As noted, the performance of the motor 140 generally depends on the temperature of the PMs (e.g., PMs 210). For example, Neodymium (NdFeB) magnets, which are one magnet type that can be used as PMs, generally have a strong dependence on temperature (e.g., the remanence ($B_r$) of NdFeB magnets can vary with temperature approximately around −0.12% per Celsius degree). Given the dependence on the PM temperature, it may be desirable to monitor the PM temperature of the motor 140. However, as noted, because the PMs are located on the rotor (e.g., rotor 208), it can be difficult to directly measure the temperature of the PMs.

Referring back to FIG. 1, for example, the direct and quadrature current values, $I_d$ and $I_q$, generated by the motor controller 120 can be used to generate the direct and quadrature voltages, $V_d$ and $V_q$, respectively. $V_d$ may be calculated using Equation (1) and $V_q$ may be calculated using Equation (2):

$$V_d = -L_q \cdot \omega \cdot I_q \quad (1)$$

$$V_q = R \cdot I_q + \varphi_m \cdot \omega \quad (2)$$

where $L_q$ is the Q axis inductance, $\omega$ is speed of the motor 140, R is the stator resistance, and $\varphi_m$ is motor flux.

Generally, when the effect of temperature is not considered, the R and $\varphi_{pm}$ values are represented in Equations (1) and (2) as constant machine parameters. These parameters however, are generally dependent on temperature and the parameters can change as shown in Equations (3) and (4):

$$\varphi_{pm} = \varphi_{pm0}[1 + \alpha(T_r - T_0)] \quad (3)$$

$$R_s = R_{s0}[1 + \beta(T_s - T_0)] \quad (4)$$

where $R_s$ is stator resistance, $R_{s0}$ is stator resistance at room temperature, $T_s$ is stator temperature, $T_r$ is rotor temperature, $T_0$ is room temperature, $\alpha$ is the rate of change of PM flux with temperature, $\beta$ is the rate of change of resistance with temperature, $\varphi_{pm}$ is the magnetic flux of the PM, and $\varphi_{pm0}$ is the (initial) magnetic flux of the PM when the PM is at room temperature. In some cases, the stator temperature can be monitored (e.g., via sensors), and $R_s$ can be iteratively calculated. However, it can be impractical to directly measure $T_r$ via sensors, given that the rotor is a rotating element. Therefore, conventional control systems generally ignore (or do not account for) the effect of temperature on the PM flux ($\varphi_{pm}$).

To address this, embodiments provide techniques for determining the PM temperature in an electric motor. The techniques described here for determining the PM temperature may be "sensorless" in that they do not use sensors (e.g., temperature sensors) to directly or indirectly measure the temperature of the PM (or rotor). As shown in FIG. 1, the control system 100 includes a temperature component 130, which is configured to perform one or more techniques described herein for predicting the temperature of the PM on the rotor of the motor 140. The temperature component 130 can include hardware, software, or combinations thereof.

In one embodiment, the temperature component 130 can use a back-emf based estimation technique to predict the rotor temperature $T_r$ (which is indicative of the PM temperature), based in part on $I_q$ and $V_q$. As shown in FIG. 1, the temperature component 130 can receive $I_q$ and $V_q$ from the motor controller 120. The back-emf based estimation technique can be used to predict $T_r$ in real-time, e.g., while the motor 140 is running or is in a runtime state. For example, the estimation calculation can be performed based on a pre-determined interval (e.g., every control iteration, every x control iterations, etc.). In one particular embodiment, the temperature component 130 can estimate $T_r$ using the following equation (5), using the back-emf of the motor 140 as an estimate of $\varphi_{pm0}$:

$$T_r = T_0 + \frac{1}{\alpha \cdot \omega \cdot \varphi_{pm0}}[V_q - R_s \cdot I_q] - \frac{1}{\alpha} \quad (5)$$

Note that FIG. 1 illustrates a reference example of a system that can control a motor, based on a prediction of the temperature of the PM of the motor. In other embodiments, the system may have a different configuration. For example, while the temperature component 130 is depicted separate from the motor controller 120, in some embodiments, the temperature component 130 may be included as part of the motor controller 120. Similarly, although the control system 110 is depicted as separate from the motor 140, in some embodiments, the control system 110 may be located within (or may be a part of) the motor 140. In general, the system 100 can have any configuration consistent with the functionality described herein.

Figure 3A:
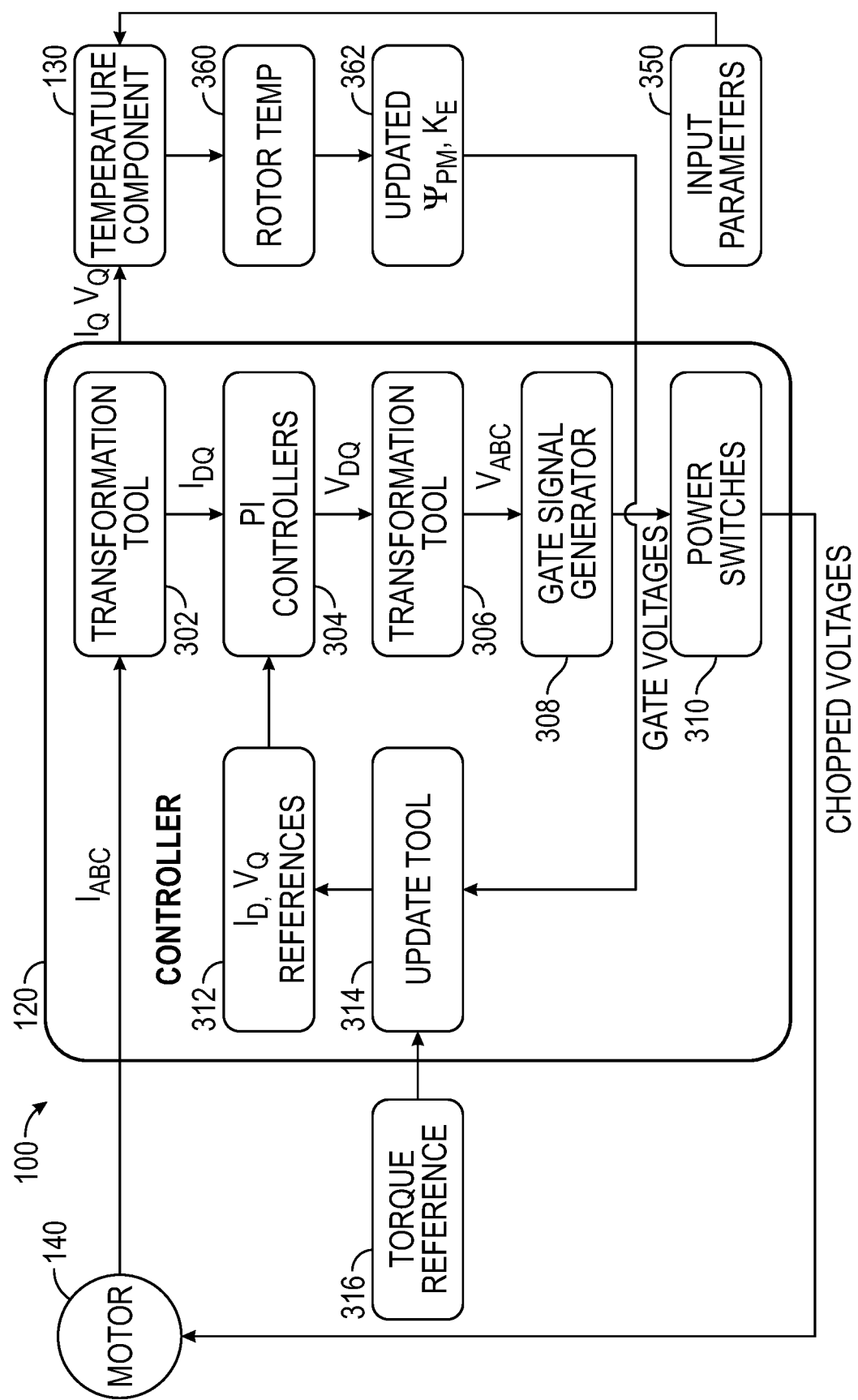
FIG. 3A is a block diagram further illustrating components of the system illustrated in FIG. 1, according to one embodiment.

FIG. 3A is a block diagram further illustrating components of the system 100, according to one embodiment. In particular, FIG. 3A illustrates an example of a torque-based motor controller 120. As shown, the motor controller 120 includes a transformation tool 302, one or more proportional-integral (PI) controllers 304, a transformation tool 306, a gate signal generator 308, one or more power switches 310, and an update tool 314. The transformation tool 302 is configured to convert the three phase current ($I_{abc}$) (from the motor 140) to direct and quadrature current values, $I_d$ and $I_q$.

The PI controllers 304 compare the $I_d$ and $I_q$ values from the transformation tool 302 to $I_d$ and $I_q$ references 312, and generate direct and quadrature voltages, $V_d$ and $V_q$, e.g., using Equations (1) and (2). $V_d$ and $V_q$ are provided to the transformation tool 306, which is configured to convert the $V_d$ and $V_q$ values to a three phase voltage $V_{abc}$. The gate signal generator 308 generates gate voltages, based on $V_{abc}$, and the power switches 310 generate chopped voltage signals for controlling the motor 140.

As described in more detail below, the temperature component 130 is configured to use the $I_q$ and $V_q$ values and the input parameters 350 (e.g., initial values, such as $R_s$, α, β, and $\varphi_{pm0}$ to predict the rotor temperature 360 and update $\varphi_{pm}$/back-emf constant ($K_e$). The temperature component 130 provides the updated $\varphi_{pm}$ and $K_e$ values 362 to the motor controller 120. The motor controller 120, via the update tool 314, updates the quadrature current value $I_q$, based on the torque reference 316 and $K_e$ (e.g., using torque T=$K_e$*$I_q$). $K_e$ generally changes proportionally with flux (e.g., $K_e$=constant*flux, where the constant is typically a machine geometry dependent parameter).

Figure 3B:
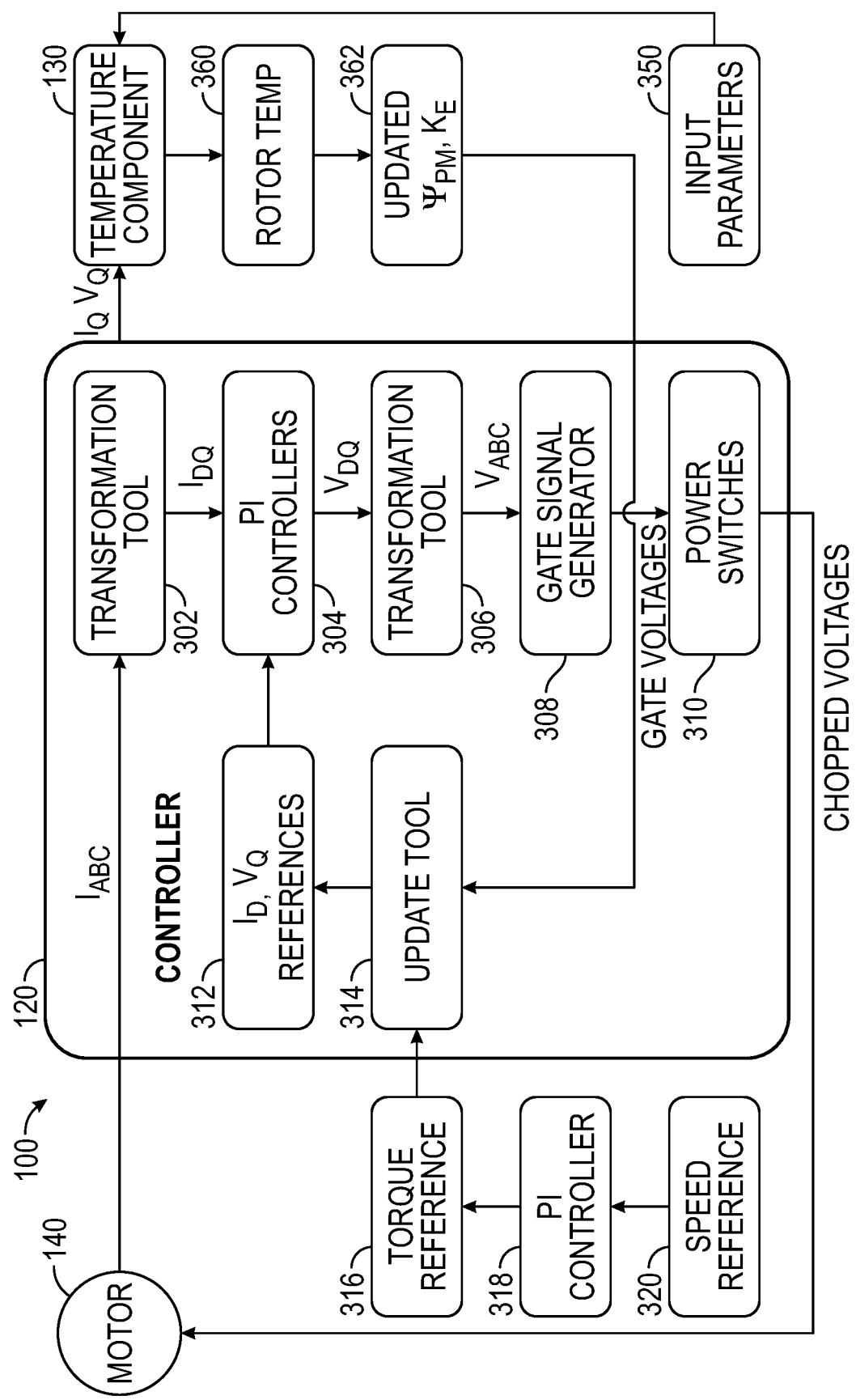
FIG. 3B is another block diagram further illustrating components of the system illustrated in FIG. 1, according to one embodiment.

FIG. 3B is a block diagram further illustrating components of the system 100, according to one embodiment. In particular, FIG. 3B illustrates an example of a speed-based motor controller 120. Compared to FIG. 3A, in this embodiment, a speed reference 320 is input into a PI controller 318 to generate the torque reference 316. Similar to FIG. 3A, the motor controller 120, via the update tool 314, updates the quadrature current value $I_q$, based on the torque reference 316 and $K_e$ (e.g., using torque T=$K_e$*$I_q$).

The accurate estimation of $K_e$ may be beneficial for FOC regardless of sensor or sensorless applications. In sensorless applications, however, the importance of accuracy of the $K_e$ estimation may be amplified, as it is also used in position and speed estimation techniques, such as phase locked loop (PLL). Thus, updating $K_e$ with temperature can increase the accuracy of the position and speed estimation.

Note that while many of the embodiments use FOC as a reference type of control system in which the techniques described herein can be used, the techniques described herein can be used for other types of control systems. For example, the $K_e$ update may allow for generating improved $I_d$ and $I_q$ references during maximum torque per ampere (MTPA) controls and during field weakening (FW). These algorithms are generally used to improve the torque speed envelope during constant torque and constant power operation. For MTPA, the $I_d$ and $I_q$ references can be generated using the following Equations (6) and (7), and for FW, the $I_d$ and $I_q$ references can be generated using the following Equations (8) and (9):

$$i_{dm} = \frac{K_e - \sqrt{K_e^2 + 8(L_q - L_d)^2 \hat{I}_s^2}}{4(L_q - L_d)} \quad (6)$$

$$i_{am} = \sqrt{\hat{I}_s^2 - i_{dm}^2} \quad (7)$$

$$i_{d,VCL} = \frac{-K_e L_d + \sqrt{(K_e L_d)^2 - (L_d^2 - L_q^2)(K_e^2 + L_q^2 \hat{I}_{max}^2 - (v_{max}/\omega_e)^2)}}{(L_q^2 - L_d^2)} \quad (8)$$

$$i_{q,VCL} = \sqrt{\hat{I}_{max}^2 - i_{d,VCL}^2} \quad (9)$$

Figure 4:
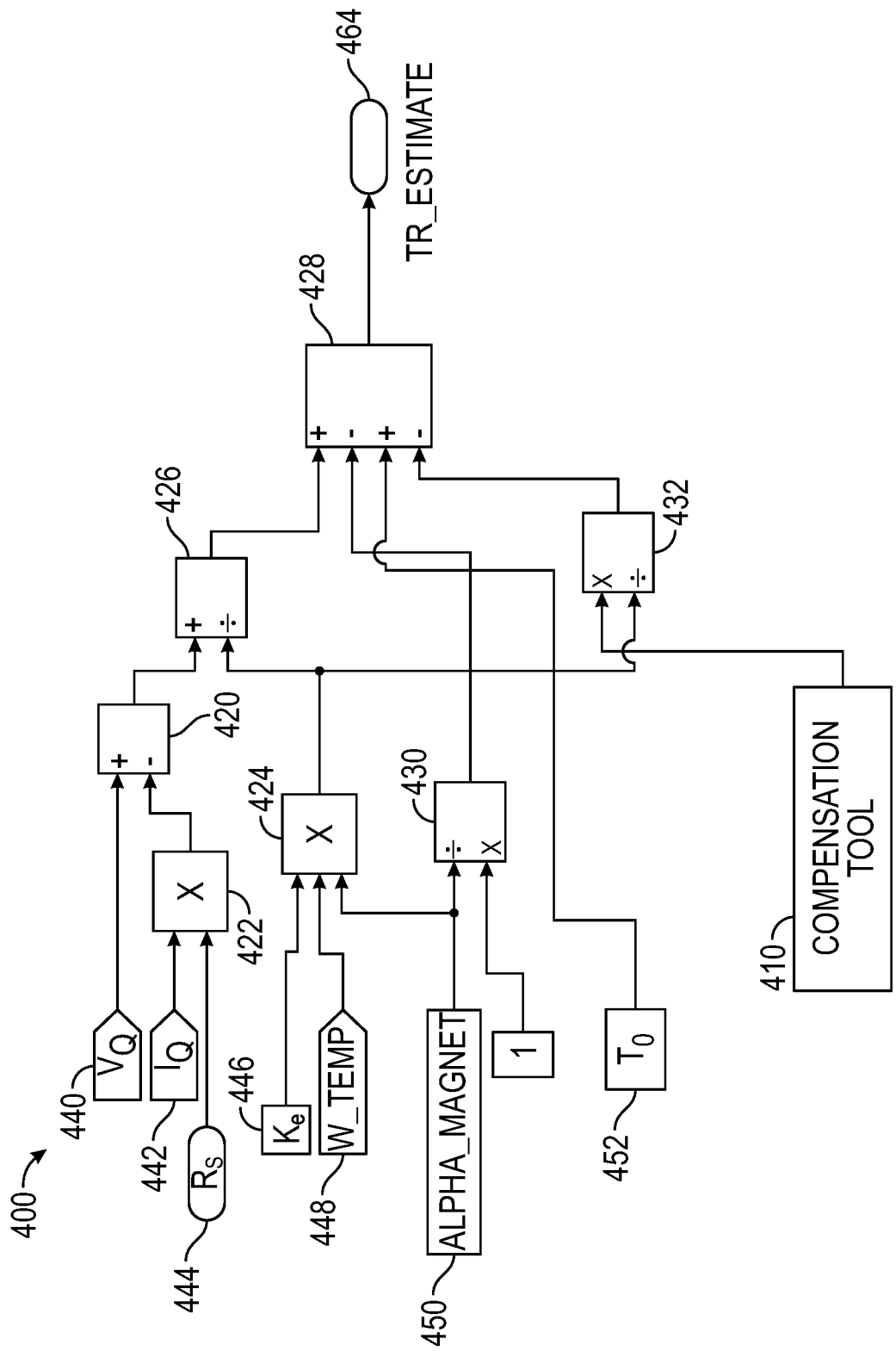
FIG. 4 illustrates an example schematic diagram for predicting the PM temperature of an electric motor, according to one embodiment.

FIG. 4 is a schematic diagram 400 for predicting the PM temperature of a motor (e.g., motor 140), according to one embodiment. For example, the schematic diagram 400 can be used to perform a sensorless operation to determine the PM temperature of the motor. The schematic diagram 400 may be implemented by the temperature component 130. In one embodiment, the schematic diagram 400 is configured to perform a back-emf based estimation of the rotor temperature $T_r$. The schematic diagram 400 includes product blocks 422 and 424, sum blocks 420 and 428, divide blocks 426, 430, and 432, and a compensation block 410.

The sum block 420 is configured to receive a first input 440 (e.g., $V_q$) and receive a second input from the output of the product block 422. The product block 422 is configured to receive an input 442 (e.g., $I_q$) and an input 444 (e.g., $R_s$) and output a product of the inputs 442 and 444 to the second input of the sum block 420. The sum block 420 is configured to output a subtraction of the second input (e.g., output of the product block 422) from the first input 440 to a first input of the divide block 426, and the product block 424 is configured to output a second input of the divide block 426. For example, the product block 424 is configured to receive a first input 446 (e.g., $K_e$, also known as a back-emf constant, which is an estimate of $\varphi_{pm0}$), a second input 448 (e.g., ω), and a third input 450 (e.g., α), and is configured to output a product of the first input 446, the second input 448, and the third input 450 to the second input of the divide block 426.

The divide block 426 is configured to output a division of its first input by its second input to a first input of the sum block 428. The sum block 428 is configured to receive a second input from the output of division block 430, which is configured to output a division of "1" by the input 450 (e.g., α). The sum block 428 is configured to receive a third input 452 (e.g., $T_0$). The sum block 428 is also configured to receive a fourth input from the output of the product block 432, which is based on input from the compensation block 410 and output from the product block 424. For example, the compensation block 410 may be employed to add an amount of compensation to the sum block 428 in order to approximate the theoretical estimation in Equation (5).

Figure 5:
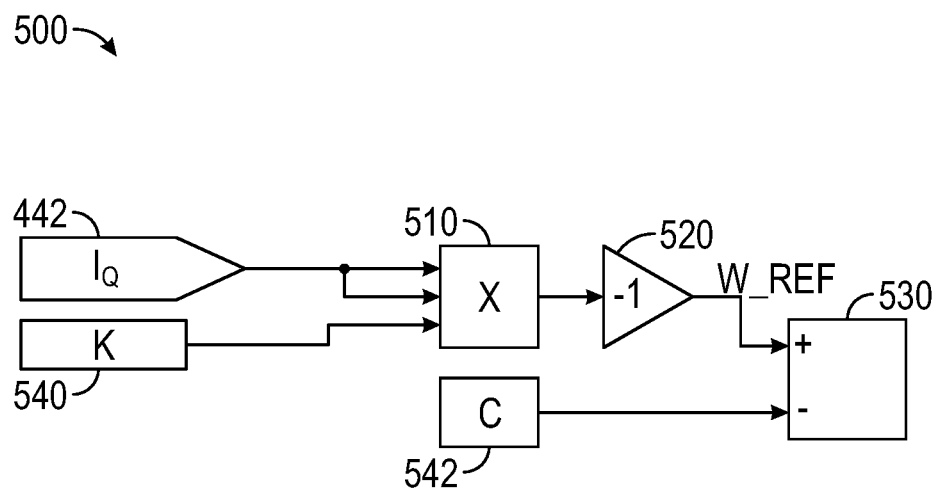
FIG. 5 illustrates an example schematic diagram for compensating for a predicted PM temperature of an electric motor, according to one embodiment.
Figure 6A:
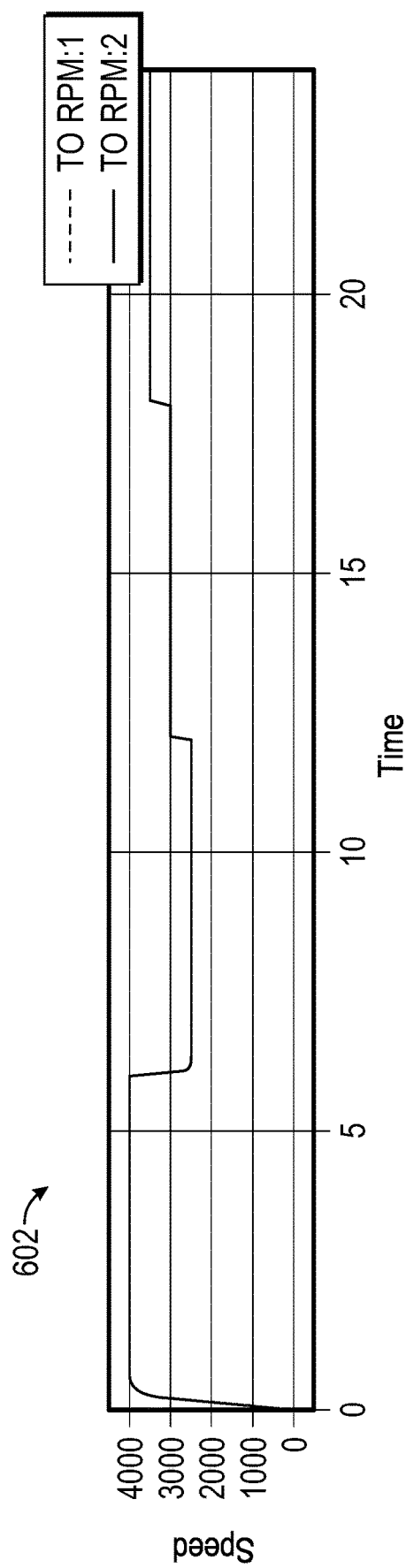
FIG. 6A is a graph of a speed profile of an electric motor, according to one embodiment.
Figure 6B:
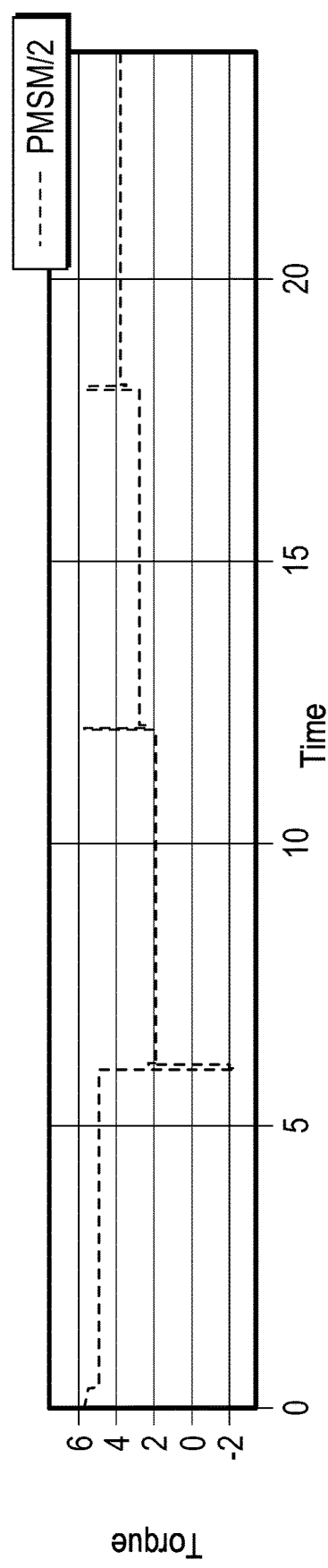
FIG. 6B is a graph of a torque profile of an electric motor, according to one embodiment.
Figure 6C:
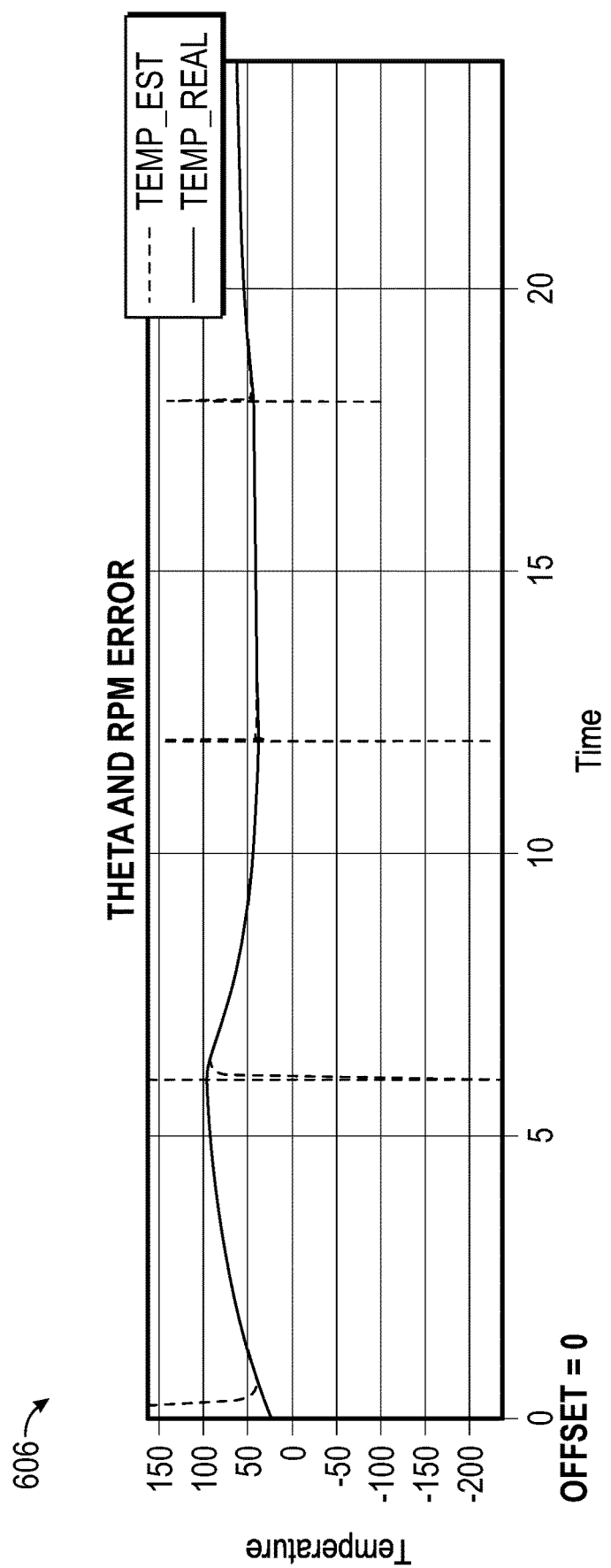
FIG. 6C is a graph of real rotor temperature and predicted rotor temperature of an electric motor having the speed profile in FIG. 6A and the torque profile in FIG. 6B, according to one embodiment.

The sum block 428 is configured to perform one or more add and subtract operations based on its first, second, third, and fourth inputs, and output an estimate of $T_r$ (e.g., $T_r$_estimate 464). In one embodiment, the rotor temperature estimation generated with the schematic 400 can be represented by the following Equation (10):

$$T_r = T_0 + \frac{1}{\alpha \cdot \omega \cdot \varphi_{pm0}}[V_q - R_s \cdot I_q] - \frac{1}{\alpha} - \left[C + \frac{K \cdot I_q^2}{\alpha \cdot \omega \cdot \varphi_{pm0}}\right] \quad (10)$$

where $$\left[C + \frac{K \cdot I_q^2}{\alpha \cdot \omega \cdot \varphi_{pm0}}\right]$$

is the compensation provided by the compensation block 410. In Equation (10), "C" and "K" may be application specific parameters. FIG. 5 is a schematic diagram 500 for generating a compensation for a predicted PM temperature of a motor (e.g., motor 140), according to one embodiment. The schematic diagram 500 may be implemented by the compensation block 410. The schematic diagram 500 includes a product block 510, a gain 520, and a sum block 530. The product block 510 is configured to output a product of the input 442 squared and the input 540 (e.g., K) to gain 520, which outputs to a first input of the sum block 530. The sum block receives a second input 542 and outputs a sum of the first and second inputs to the product block 432 illustrated in FIG. 4. FIG. 6C is a graph 606 showing real rotor temperature vs. predicted rotor temperature over time for the motor 140, assuming the motor 140 has the speed and torque profiles 602, 604 illustrated in FIGS. 6A and 6B, respectively.

In some cases, because the rotor temperature prediction method described herein is based on the quadrature current and voltage values, there can be overshoots in the predicted rotor temperatures during speed transience of the motor. As shown in FIG. 6C, for example, the predicted rotor temperature may overshoot the real rotor temperature (e.g., the difference between real and predicted temperatures may be larger than a threshold), when the speed of the motor changes (as illustrated in FIG. 6A).

Figure 7:
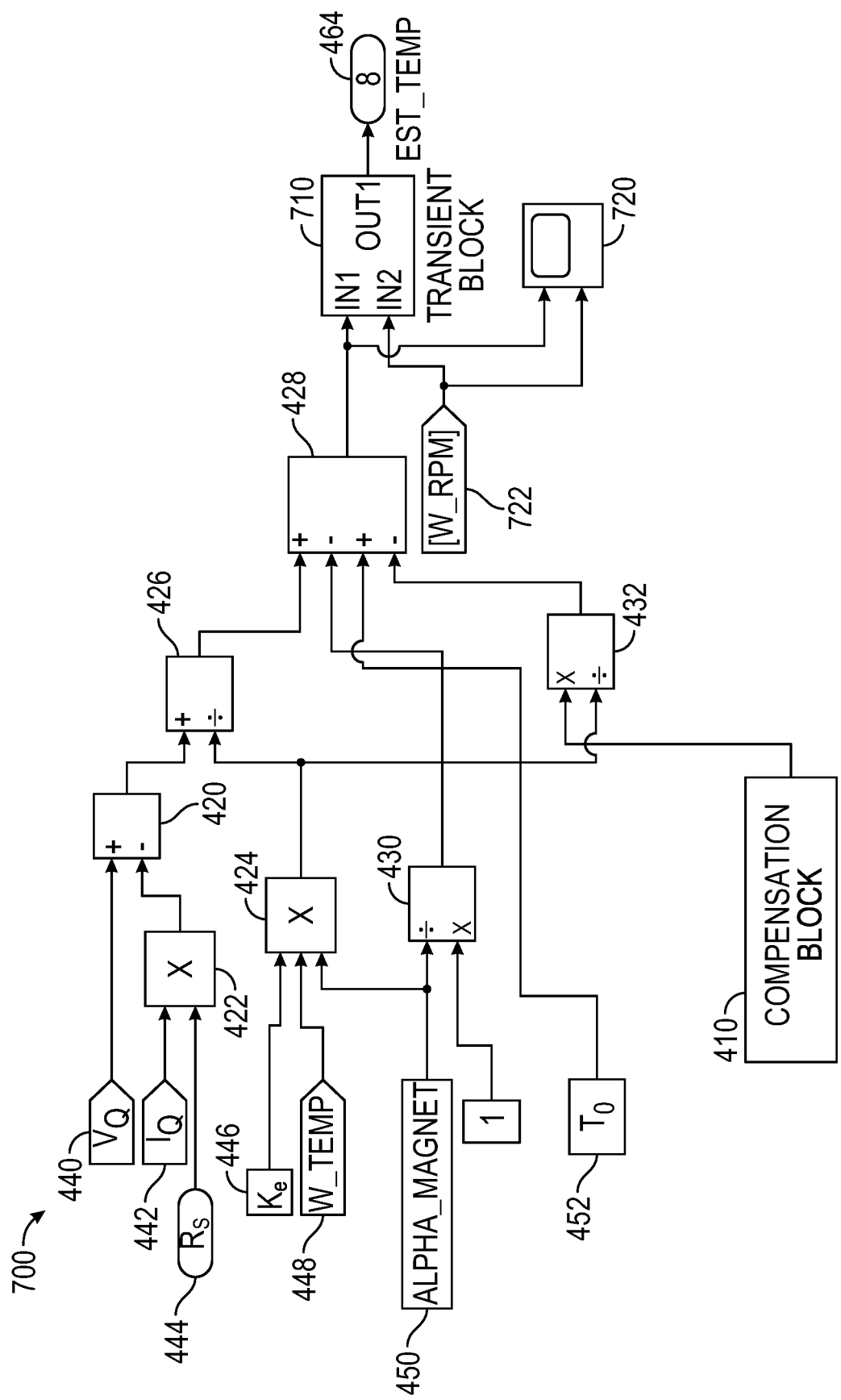
FIG. 7 illustrates another example schematic diagram for predicting the PM temperature of an electric motor, according to one embodiment.

To address this, embodiments provide techniques for preventing overshoots in the predicted rotor temperatures. In particular, embodiments provide a transient component that can detect the rate of change of speed of the motor and pass the current temperature estimation when the rate of change of speed satisfies a predetermined condition. FIG. 7 illustrates an example schematic diagram 700 for predicting the PM temperature of an electric motor (e.g., motor 140), according to one embodiment. Compared to the schematic diagram 400 illustrated in FIG. 4, the schematic diagram 700 includes a transient block 710, which is configured to receive a first input (e.g., predicted rotor temperature) from the output of the sum block 428 and receive a second input 722 (e.g., speed (rpm) of the motor).

Figure 8:
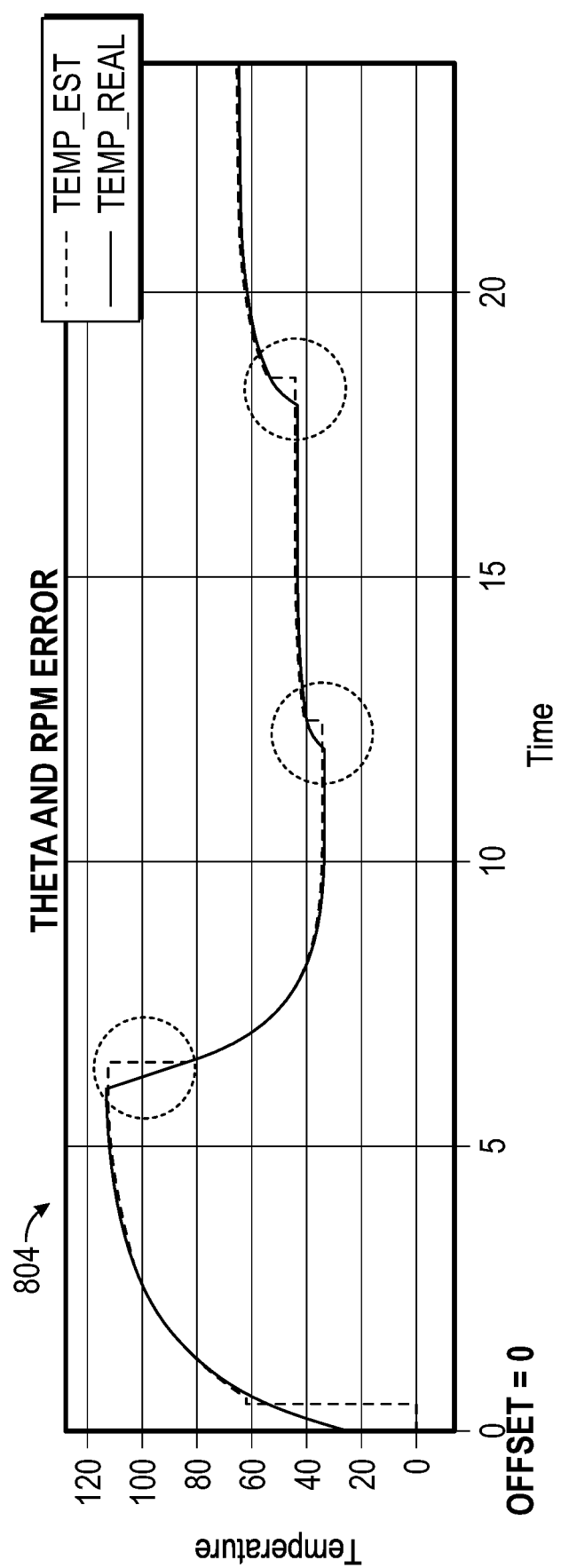
FIG. 8 is a graph of real rotor temperature and predicated rotor temperature for a temperature component with a transient filter, according to one embodiment.

In one embodiment, the transient block 710 is configured to detect the rate of change of speed and pass the current temperature estimation from sum block 428 when the speed (e.g., input 722) is in steady state. In one embodiment, the transient block 710 may determine that the speed is in steady state when the rate of change of the speed is less than a threshold. An example of the real and predicted rotor temperatures without a transient block 710 is depicted in FIG. 6C, assuming the motor has the speed and torque profiles 602, 604 illustrated in FIGS. 6A and 6B, respectively. FIG. 8 depicts an example graph 804 of the real and predicted rotor temperatures with a transient block 710, assuming the motor has the speed and torque profiles 602, 604 illustrated in FIGS. 6A and 6B, respectively.

Figure 9:
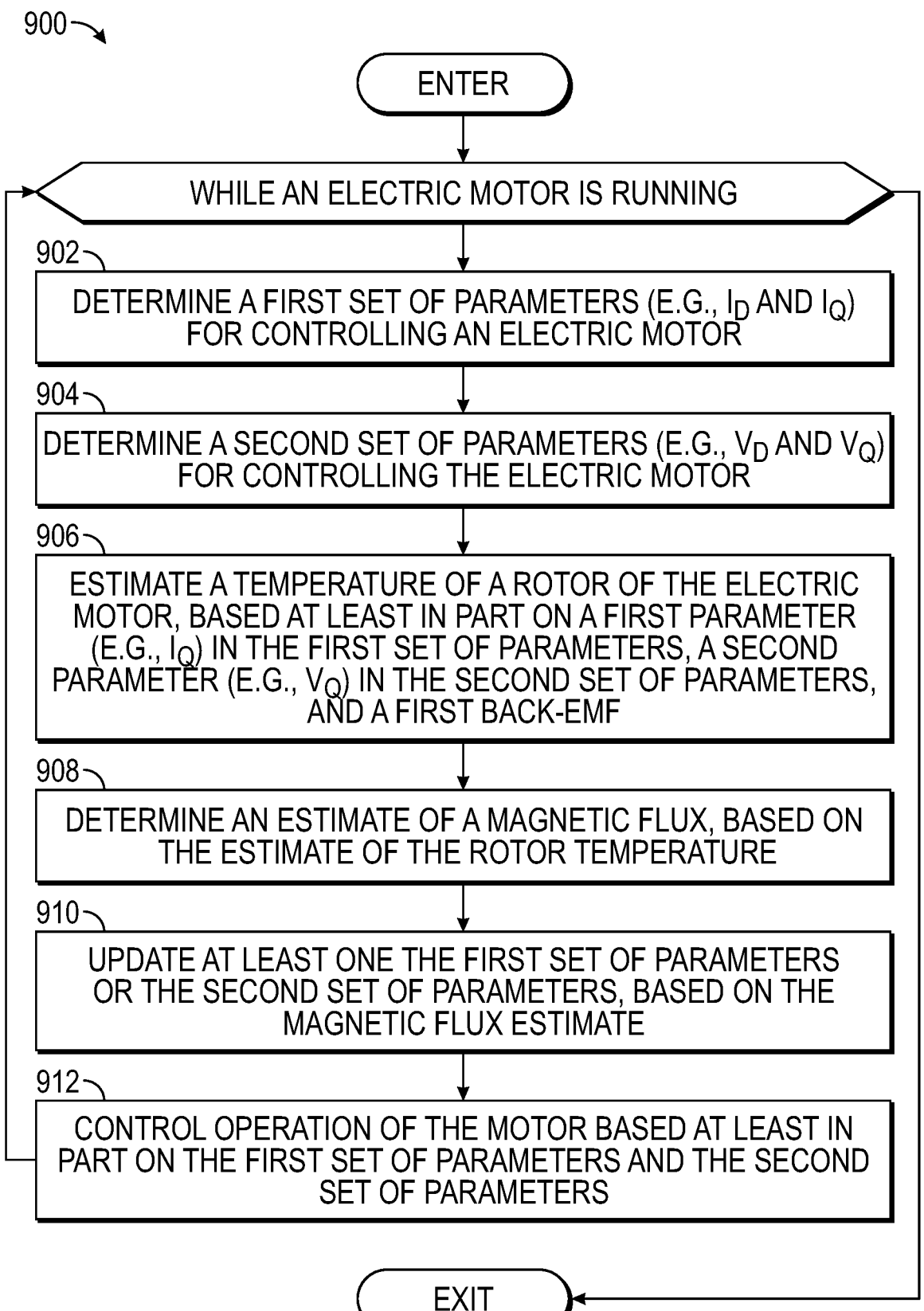
FIG. 9 is a flowchart of a method for predicting the temperature of a PM of an electric motor, according to one embodiment.

FIG. 9 is a flowchart of a method 900 for predicting the temperature of a PM of an electric motor, according to one embodiment. The method 900 may be performed by one or more components of a control system (e.g., control system 110). In one particular embodiment, the method 900 is performed by a temperature component (or temperature estimator) (e.g., temperature component 130). In one embodiment, the method 900 may be performed in real-time (e.g., while the electric motor is running).

Method 900 may enter at block 902, where the control system determines a first set of parameters (e.g., $I_d$ and $I_q$) for controlling an electric motor (e.g., motor 140). As noted, the first set of parameters may be generated based on a current output (e.g., $I_{abc}$) of the electric motor. At block 904, the control system determines a second set of parameters (e.g., $V_d$ and $V_q$) for controlling the electric motor. For example, the control system may use a set of controllers (e.g., PI controllers 304) to generate the second set of parameters, based on the first set of parameters and a set of current references (e.g., $I_d$, $I_q$ references 312).

At block 906, the control system estimates a temperature of a rotor of the electric motor, based at least in part on a first parameter (e.g., $I_q$) in the first set of parameters, a second parameter (e.g., $V_q$) in the first set of parameters, and a first back-emf value. In one embodiment, the control system can use a back-emf based estimation technique to predict the rotor temperature. In this technique, the control system can use the first back-emf ($K_e$) value as an estimate of the magnetic flux (e.g., $\varphi_{pm0}$) in Equations (5) and (6). In one embodiment, the control system can implement the schematic diagram 400 in order to determine the estimate of the rotor temperature. In one embodiment, the control system can implement the schematic diagram 700 in order to determine the estimate of the rotor temperature. The estimate of the rotor temperature may be used as the temperature of the PM.

In some embodiments, the control system (as part of block 906) may determine an amount of compensation (e.g., using compensation block 410) based at least in part on a squared value of the quadrature current value and the first back-emf. In some embodiments, the amount of compensation may be linearly-wise or polynomial-wise dependent on the torque of the electric motor. In some embodiments, the amount of compensation may be linearly-wise or polynomial-wise dependent on the speed of the electric motor. In some embodiments, the amount of compensation may be linearly-wise or polynomial-wise dependent on the quadrature current value. The control system may estimate the temperature of the rotor further based on the amount of compensation. In some embodiments, the control may determine that compensation is not needed (e.g., the schematic diagram 400 may not include a compensation block 410, the amount of compensation may be minimal or zero, etc.).

At block 908, the control system determines an estimate of a magnetic flux, based on the estimate of the rotor temperature (e.g., using Equation (3)). At block 910, the control system updates at least one of the first set of parameters or the second set of parameters, based on the magnetic flux estimate. In one embodiment, for example, the control system can determine an updated $K_e$ value (based on the updated magnetic flux estimate) and use the updated Ke value to update $I_q$.

At block 912, the control system controls operation of the electric motor, based at least in part on the first set of parameters and the second set of parameters. For example, the control system can perform torque or speed based control of the electric motor using the updated first and/or second set of parameters.

Figure 10:
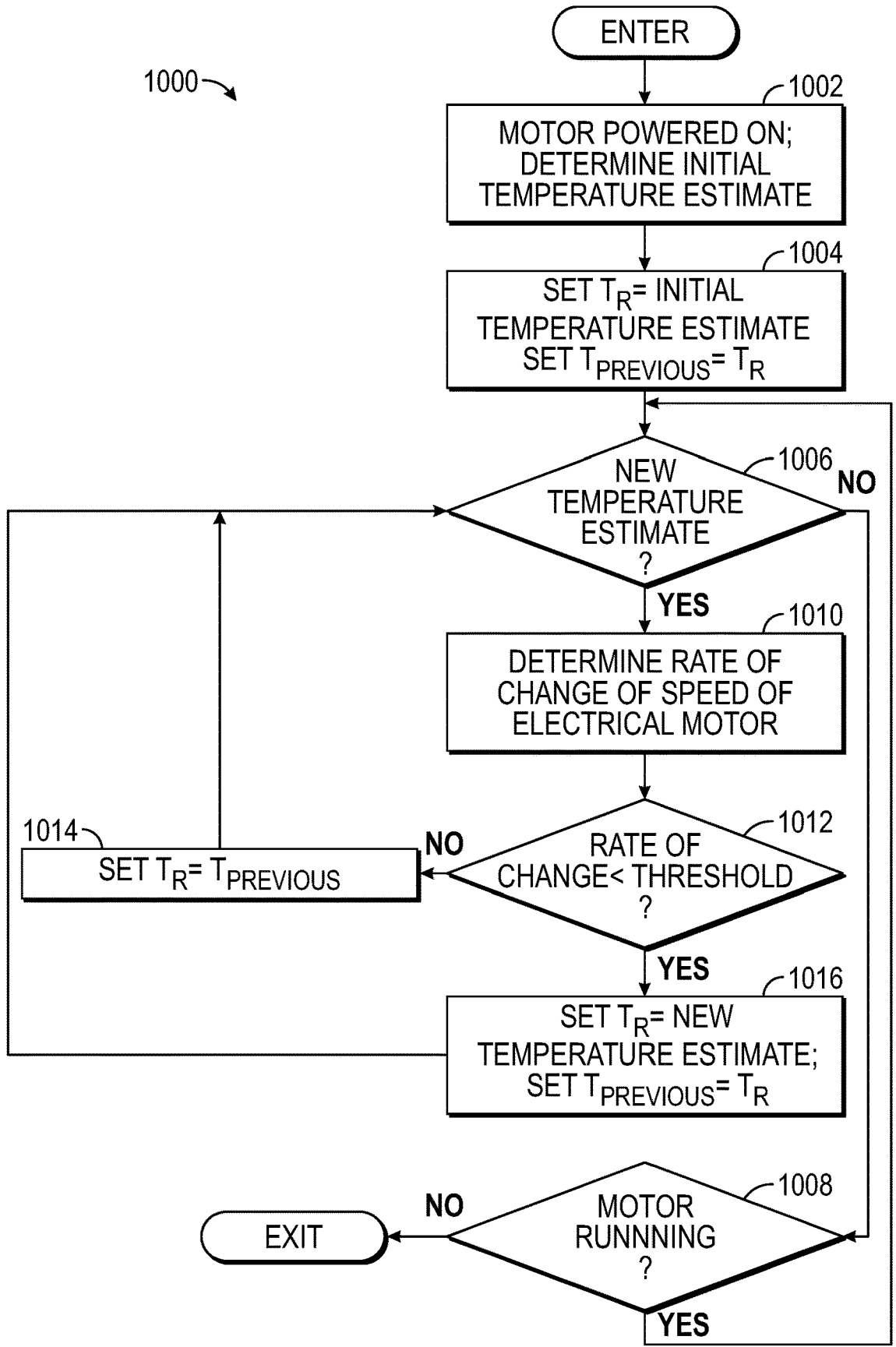
FIG. 10 is a flowchart of a method for implementing a transient control of a predicted temperature of a PM of an electric motor, according to one embodiment.

FIG. 10 is a flowchart of a method 1000 for implementing a transient control of a predicted temperature of a PM of an electric motor, according to one embodiment. The method 1000 may be performed by one or more components of a control system (e.g., control system 110). In one particular embodiment, the method 1000 can be performed by a temperature component (or temperature estimator) (e.g., temperature component 130) or transient component (e.g., transient block 710).

Method 1000 may enter at block 1002, where the control system determines an initial temperature estimate (e.g., using schematic diagram 400, 700, etc.) upon determining that the motor is powered on. At block 1004, the control system sets $T_r$=initial temperature estimate and sets $T_{previous}=T_r$. At block 1006, the control system determines whether there is a new temperature estimate. For example, the control system can be configured to determine an updated temperature estimate based on predefined time interval (e.g., every control iteration, every x control iterations, etc.).

If a new temperature estimate is unavailable, then the control system determines whether the motor is still running (block 1008). If so, the method 1000 proceeds to block 1006. If the motor is not running, the method 1000 exits. If a new temperature estimate is available, then the control system determines a rate of change of the speed of the electric motor (block 1010). At block 1012, the control system determines whether the rate of change is less than a threshold. If so, then the control system sets $T_r$=new temperature estimate and sets $T_{previous}$=$T_r$ (block 1016). If the rate of change is greater than or equal to the threshold, then the control system sets $T_r$=$T_{previous}$ (block 1014). The method 1000 then proceeds to block 1006.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the features and elements described herein, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer-implemented method comprising:
   determining a first parameter and a second parameter for controlling an electrical motor comprising a rotor and a permanent magnet disposed on the rotor;
   determining a temperature of the rotor at a first time instance during a runtime of the electrical motor, based at least in part on the first parameter, the second parameter, and a first back-electromotive force (back-emf) associated with the electrical motor;
   determining a rate of change of speed of the electrical motor at the first time instance during the runtime of the electrical motor;
   determining a first estimate of a magnetic flux of the permanent magnet, based on the temperature of the rotor, wherein the first estimate of the magnetic flux of the permanent magnet is determined based on the temperature of the rotor upon determining that the rate of change of speed of the electrical motor at the first time instance is less than a threshold; and
   controlling an operation of the electrical motor based at least in part on the first estimate of the magnetic flux of the permanent magnet.

2. The computer-implemented method of claim 1, wherein the first back-emf is used as a second estimate of the magnetic flux of the permanent magnet when the permanent magnet is at room temperature.

3. The computer-implemented method of claim 1, wherein the first estimate of the magnetic flux is an estimate of the magnetic flux of the permanent magnet when the permanent magnet is at the temperature of the rotor.

4. The computer-implemented method of claim 3, further comprising determining a second back-emf associated with the electrical motor, based on the first estimate of the magnetic flux of the permanent magnet.

5. The computer-implemented method of claim 4, further comprising determining an updated first parameter for controlling the electrical motor based on at least one of the first estimate of the magnetic flux of the permanent magnet or the second back-emf.

6. The computer-implemented method of claim 5, wherein:
   the first parameter comprises a quadrature current value;
   the second parameter comprises a quadrature voltage value; and
   the updated first parameter comprises an updated quadrature current value.

7. The computer-implemented method of claim 5, wherein controlling the operation of the electrical motor comprises adjusting at least one of a torque or a speed of the electrical motor based on at least the updated first parameter.

8. The computer-implemented method of claim 1, the computer-implemented method further comprising determining an amount of compensation based at least in part on (i) a linear-wise or a polynomial-wise value of a torque of the electrical motor, (ii) a linear-wise or a polynomial-wise value of a speed of the electrical motor, (iii) or a linear-wise or a polynomial-wise value of a quadrature current associated with the electrical motor, wherein the temperature of the rotor is generated further based on the amount of compensation.

9. The computer-implemented method of claim 1, wherein the operation of the electrical motor is controlled via a sensorless field oriented control (FOC) system.

10. The computer-implemented method of claim 1, wherein the operation of the electrical motor is controlled via a sensor field oriented control (FOC) system.

11. A non-transitory computer-readable storage medium having computer-readable program code embodied therewith, the computer-readable program code executable by one or more computer processors to perform an operation comprising:
   determining a first parameter and a second parameter for controlling an electrical motor comprising a rotor and a permanent magnet disposed on the rotor;
   determining a rate of change of speed of the electrical motor at a first time instance during a runtime of the electrical motor;
   determining a temperature of the rotor at a second time instance, prior to the first time instance, during the runtime of the electrical motor, based at least in part on the first parameter, the second parameter, and a first back-electromotive force (back-emf) associated with the electrical motor;
   determining a first estimate of a magnetic flux of the permanent magnet, based on the temperature of the rotor, wherein the first estimate of the magnetic flux of the permanent magnet is determined based on the temperature of the rotor upon determining that the rate of change of speed of the electrical motor at the first time instance is greater than or equal to a threshold; and
   controlling an operation of the electrical motor based at least in part on the first estimate of the magnetic flux of the permanent magnet.

12. An electrical device comprising:
an electrical motor comprising a rotor and at least one permanent magnet disposed on the rotor; and
a controller coupled to the electrical motor, the controller being configured to:
  determine a temperature of the rotor at a first time instance during a runtime of the electrical motor, based at least in part on a first parameter, a second parameter, and a first back-electromotive force (back-emf) associated with the electrical motor;
  determine a rate of change of speed of the electrical motor at the first time instance during the runtime of the electrical motor;
  determine a first estimate of a magnetic flux of the permanent magnet, based on the temperature of the rotor, wherein the first estimate of the magnetic flux of the permanent magnet is determined based on the temperature of the rotor upon determining that the rate of change of speed of the electrical motor at the first time instance is less than a threshold; and
  control an operation of the electrical motor based at least in part on the first estimate of the magnetic flux of the permanent magnet.

13. The electrical device of claim 12, wherein the first back-emf is used as a second estimate of the magnetic flux of the permanent magnet when the permanent magnet is at room temperature.

14. The electrical device of claim 12, wherein the first estimate of the magnetic flux is an estimate of the magnetic flux of the permanent magnet when the permanent magnet is at the temperature of the rotor.

15. The electrical device of claim 14, wherein the controller is further configured to determine a second back-emf associated with the electrical motor, based on the first estimate of the magnetic flux of the permanent magnet.

16. The electrical device of claim 15, wherein the controller is further configured to determine an updated first parameter for controlling the electrical motor based on at least one of the first estimate of the magnetic flux of the permanent magnet or the second back-emf.

17. The electrical device of claim 16, wherein:
the first parameter comprises a quadrature current value;
the second parameter comprises a quadrature voltage value; and
the updated first parameter comprises an updated quadrature current value.

18. The electrical device of claim 16, wherein controlling the operation of the electrical motor comprises adjusting at least one of a torque or a speed of the electrical motor based on at least the updated first parameter.

19. The electrical device of claim 12, wherein the controller is further configured to determine an amount of compensation based at least in part on (i) a linear-wise or a polynomial-wise value of a torque of the electrical motor, (ii) a linear-wise or a polynomial-wise value of a speed of the electrical motor, (iii) or a linear-wise or a polynomial-wise value of a quadrature current associated with the electrical motor, wherein the temperature of the rotor is determined further based on the amount of compensation.

20. The electrical device of claim 12, wherein the operation of the electrical motor is controlled via a sensorless field oriented control (FOC) system or a sensor FOC system.

* * * * *